(12) United States Patent
Burr et al.

(10) Patent No.: US 10,423,199 B2
(45) Date of Patent: Sep. 24, 2019

(54) DYNAMIC THERMAL PLATFORM OPERATING POINT FOR ELECTRONIC DEVICES

(71) Applicant: Intel Corporation, Santa Clara, CA (US)

(72) Inventors: Jeremy Burr, Portland, OR (US); David W. Browning, Beaverton, OR (US); Shawn S. McEuen, Portland, OR (US); Mark MacDonald, Beaverton, OR (US); Matthew D. Coakley, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/665,873

(22) Filed: Aug. 1, 2017

(65) Prior Publication Data

US 2018/0173283 A1 Jun. 21, 2018

Related U.S. Application Data

(63) Continuation of application No. 14/580,036, filed on Dec. 22, 2014, now Pat. No. 9,720,464.

(51) Int. Cl.
*G06F 1/16* (2006.01)
*H05K 5/00* (2006.01)
(Continued)

(52) U.S. Cl.
CPC ............ *G06F 1/203* (2013.01); *G06F 1/1632* (2013.01); *G06F 1/206* (2013.01)

(58) Field of Classification Search
CPC .......... G06F 1/1632; G06F 1/20; G06F 1/203; G06F 1/206
(Continued)

(56) References Cited

U.S. PATENT DOCUMENTS 5,704,212 A * 1/1998 Erler ...................... F25B 21/04
361/679.41
6,038,128 A * 3/2000 Hood, III .............. G06F 1/1632
174/15.2
(Continued)

FOREIGN PATENT DOCUMENTS

WO 2003/034664 A1 4/2003
WO 2004/112331 A1 12/2004
(Continued)

OTHER PUBLICATIONS

Non-Final Office Action from U.S. Appl. No. 14/580,036, 10 pages, dated Dec. 1, 2016.
(Continued)

*Primary Examiner* — Anthony M Haughton
(74) *Attorney, Agent, or Firm* — Jaffery Watson Mendonsa & Hamilton LLP

(57) ABSTRACT

In one example a electronic device comprises a housing, at least one heat generating component disposed within the housing, at least one internal heat dissipation device positioned proximate the at least one heat generating component, and a thermal interface defined in at least a portion of the housing to allow direct thermal contact between the heat dissipation device and an external heat dissipation device. Other examples may be described.

9 Claims, 11 Drawing Sheets

(51) Int. Cl.
  *H05K 7/00* (2006.01)
  *G06F 1/20* (2006.01)

(58) Field of Classification Search
  USPC ....... 361/679.41–679.44, 679.547, 701, 702, 361/709, 710
  See application file for complete search history.

(56) References Cited

U.S. PATENT DOCUMENTS

| | | | |
|---|---|---|---|
| 6,275,945 B1* | 8/2001 | Tsuji | G06F 1/1632 361/679.4 |
| 6,453,378 B1* | 9/2002 | Olson | G06F 1/1632 361/679.41 |
| 6,601,179 B1 | 7/2003 | Jackson et al. | |
| 6,691,197 B2 | 2/2004 | Olson et al. | |
| 6,837,057 B2* | 1/2005 | Pokharna | G06F 1/203 361/679.41 |
| 7,668,958 B2 | 2/2010 | Burr | |
| 7,761,641 B2 | 7/2010 | Mok et al. | |
| 7,957,131 B1 | 6/2011 | Mongia et al. | |
| 8,321,587 B2 | 11/2012 | Burr | |
| 8,634,183 B2 | 1/2014 | Wikander et al. | |
| 9,081,554 B2 | 7/2015 | MacDonald et al. | |
| 2003/0045296 A1 | 3/2003 | Burr | |
| 2004/0253979 A1 | 12/2004 | Burr | |
| 2008/0150122 A1 | 6/2008 | Lee et al. | |
| 2009/0322472 A1 | 12/2009 | MacDonald et al. | |
| 2009/0323275 A1 | 12/2009 | Rehmann et al. | |
| 2013/0114203 A1 | 5/2013 | Ignatchenko et al. | |
| 2014/0160668 A1 | 6/2014 | Heymann et al. | |

FOREIGN PATENT DOCUMENTS

| | | |
|---|---|---|
| WO | 2012/087765 A2 | 6/2012 |
| WO | 2016/105793 A1 | 6/2016 |

OTHER PUBLICATIONS

Notice of Allowance from U.S. Appl. No. 14/580,036, 9 pages, dated Apr. 5, 2017.

International Search Report and Written Opinion from PCT Application No. PCT/US2015/062283, 13 pages, dated Mar. 4, 2016.

* cited by examiner

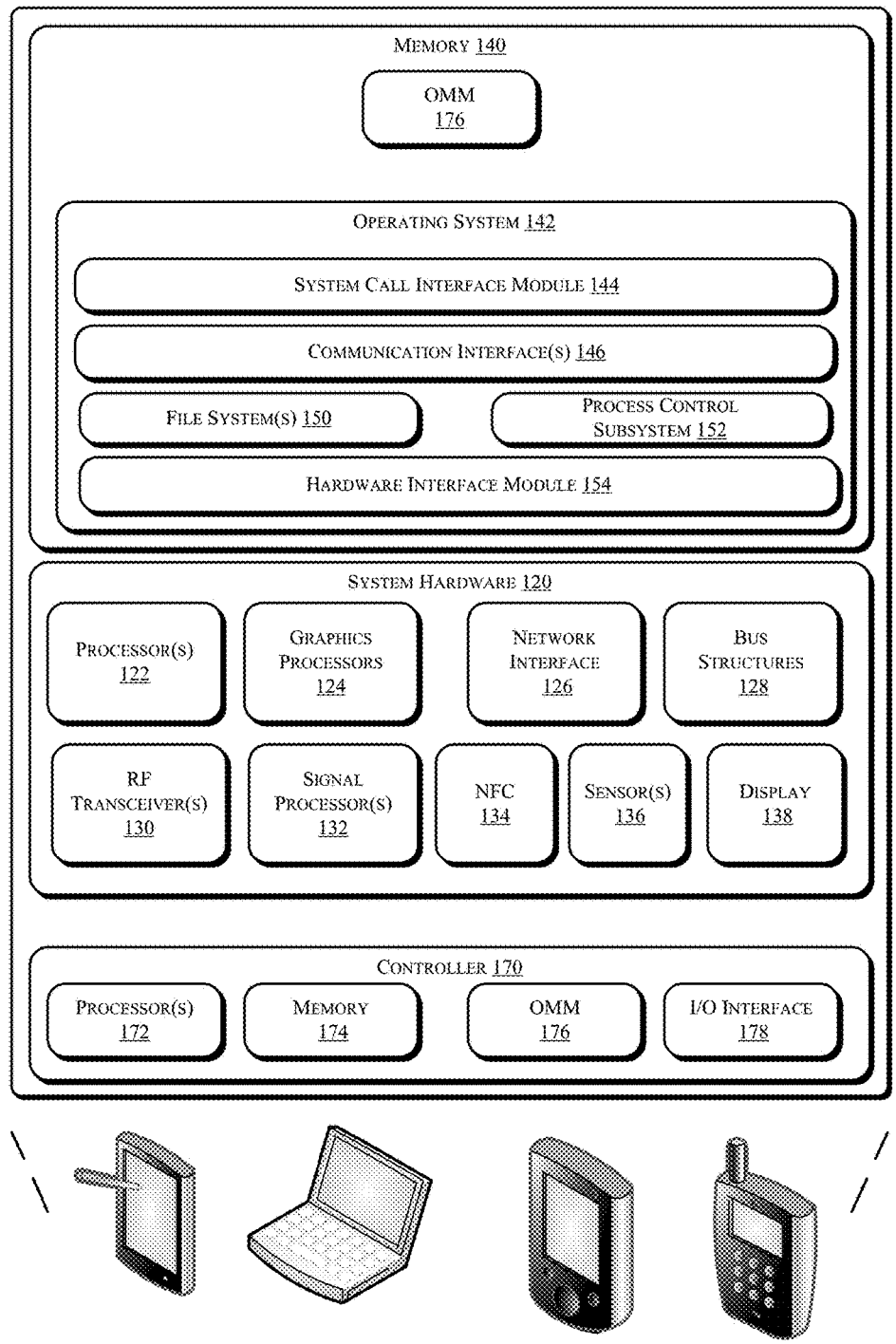
FIG. 1A  Electronic Device 100

DYNAMIC THERMAL PLATFORM OPERATING POINT FOR ELECTRONIC DEVICES

RELATED APPLICATIONS

This application is a continuation and claims priority under 35 U.S.C. § 120 of pending U.S. patent application Ser. No. 14/580,036, filed Dec. 22, 2014, entitled DYNAMIC THERMAL PLATFORM OPERATING POINT FOR ELECTRONIC DEVICES. The entire disclosure(s) of these documents are incorporated by reference herein for all purposes.

BACKGROUND

The subject matter described herein relates generally to the field of electronic devices and more particularly to a dynamic thermal platform operating point for electronic devices.

Electronic devices such as laptop computers, tablet computing devices, electronic readers, mobile phones, and the like may include heat generating components, e.g., integrated circuits, displays, and the like. The performance of such electronic devices may be limited by heat dissipation capabilities of the electronic devices. To accommodate limitations in heat dissipation, electronic devices may be designed to operate their various subsystems in accordance with operating guidelines that manage power consumption by various subsystems. Such guidelines are sometimes referred to as thermal design operating points (TDPs) or thermal design thermal design management algorithms.

Most electronic devices are designed with fixed thermal design operating point (TDP) established during testing of the device. It may be useful in some instances to accommodate changes in heat dissipation capabilities for electronic devices. Accordingly, techniques which enable an electronic device to implement a flexible or dynamic thermal design operating point (TDP) may find utility.

BRIEF DESCRIPTION OF THE DRAWINGS

The detailed description is described with reference to the accompanying figures.

FIGS. 1A-1C are schematic illustrations of electronic devices which may be adapted to include a dynamic thermal platform operating point (TDP) in accordance with some examples.

DETAILED DESCRIPTION

Described herein are exemplary systems and methods to implement a dynamic thermal platform operating point (TDP) in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Figure 1B:
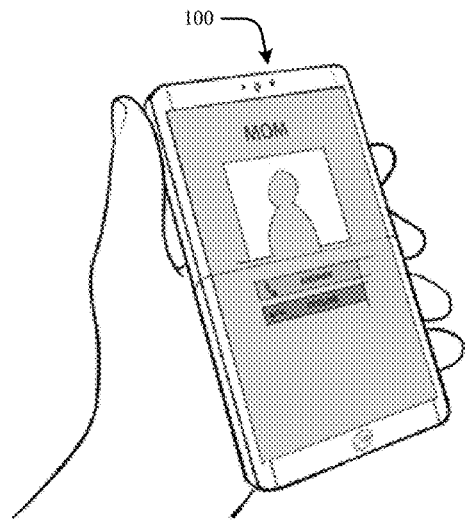
Figure 1C:
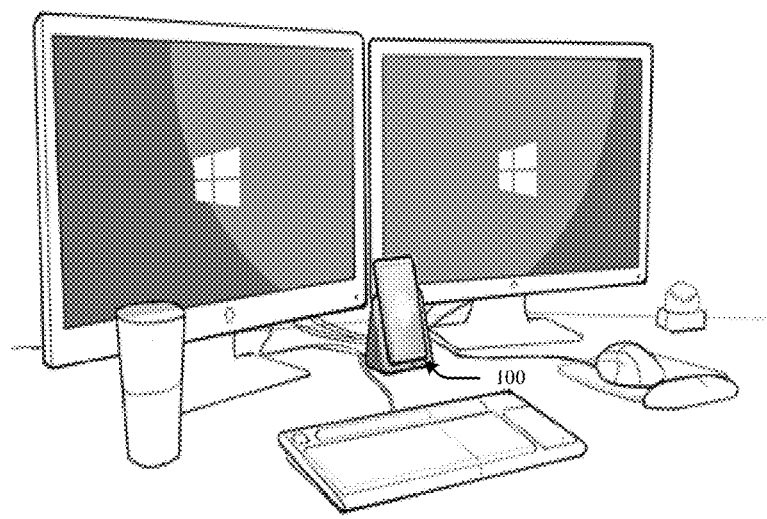

FIGS. 1A-1C are schematic illustrations of electronic devices which may be adapted to include a dynamic thermal platform operating point (TDP) in accordance with some examples. Referring first to FIG. 1A, in various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3—2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G—2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G—2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more sensors 136 such as a thermal sensor, a coupling sensor, or the like. Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may be logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms.

In the embodiment depicted in FIG. 1 the controller 170 comprises a processor 172, a memory module 174, an operating mode management unit (OMM) 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples portions of the operating mode management unit 176 may reside in the memory 140 of electronic device 100 and may be executable on one or more of the processors 122.

In some examples the operating mode management unit 176 interacts with one or more other components of the electronic device 100 to assess changes in the thermal dissipation capabilities of the electronic device 100 and to manage the thermal platform management algorithms to accommodate such changes. For example, referring to FIG. 1B, the operating mode management unit 176 may establish a first thermal operating point (TDP) for the electronic device 100 when the electronic device 100 is operating independently. By contrast, referring to FIG. 1C, the operating mode management unit 176 may establish a second thermal operating point (TDP) for the electronic device 100 when the electronic device 100 is operating in an environment in which it is coupled to an external device such as a docking station which includes additional thermal dissipation systems.

Figure 2:
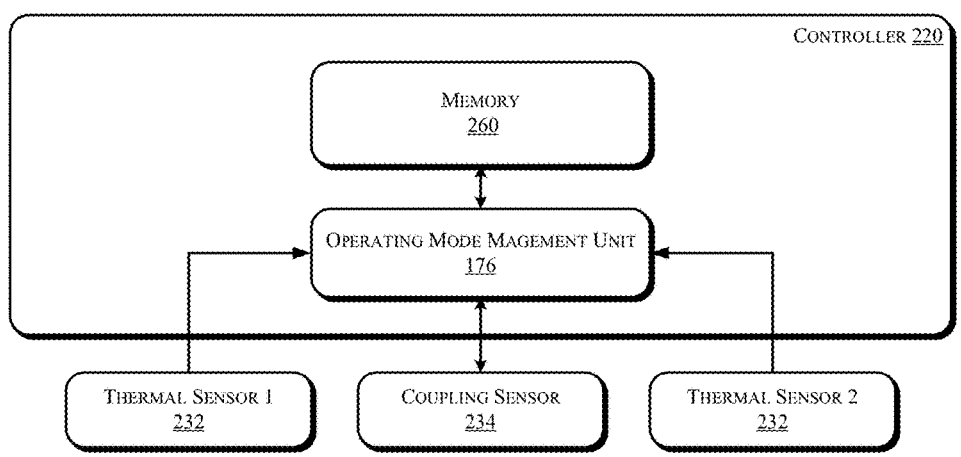
FIG. 2 is a high-level schematic illustration of an exemplary architecture to implement a dynamic thermal platform operating point (TDP) in accordance with some examples.

FIG. 2 is a high-level schematic illustration of an exemplary architecture to implement an operating mode management unit 176 in electronic devices. Referring to FIG. 2, a controller 220 may be embodied as general purpose processor 122 or as a low-power controller such as controllers 170. Controller 220 may comprise an operating mode management unit 176 and a local memory 260. As described above, in some examples the operating mode management unit 176 may be implemented as logic instructions executable on controller 220, e.g., as software or firmware, or may be reduced to hardwired logic circuits. Local memory 260 may be implemented using volatile and/or non-volatile memory.

Controller 220 may be communicatively coupled to one or more local devices input/output (I/O) devices which provide signals that provide information about the operating environment in which electronic device 100 operates. For example, the operating mode management unit 176 in controller 220 may be communicatively coupled to one or more thermal sensors 232. Similarly, operating mode management unit 176 may be coupled to one or more coupling sensors 234.

Figure 3:
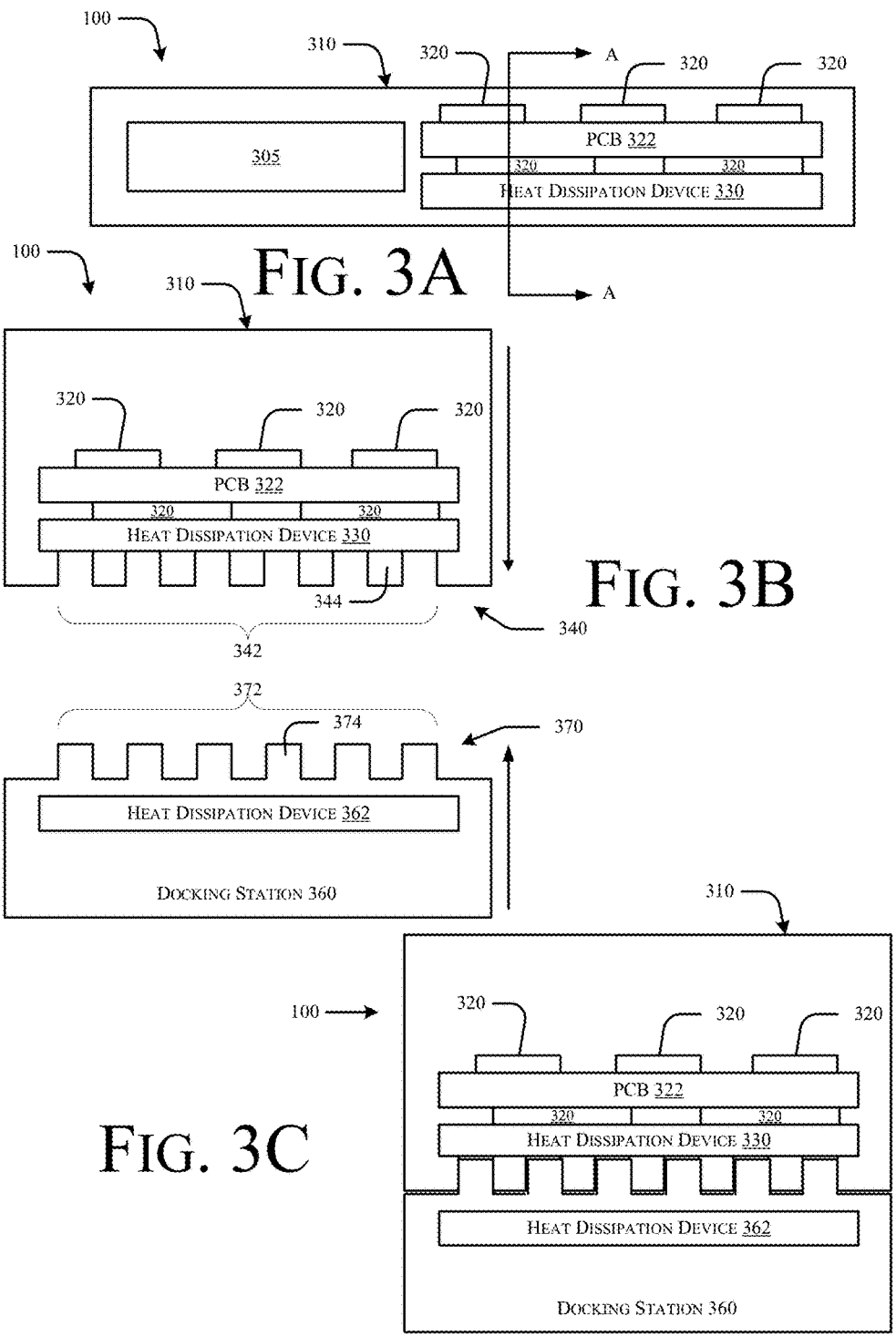
FIGS. 3A-3C are schematic illustrations of an electronic device which may be adapted to include a dynamic thermal platform operating point (TDP) in accordance with some examples.

FIGS. 3A-3C are schematic illustration of an electronic device which may be adapted to include a dynamic thermal platform operating point (TDP) in accordance with some examples. Referring to FIG. 3A-3C, in some examples an electronic device 100 comprises a housing 310 to encapsulate at least a portion of the electronic device 100. The housing 310 may be formed from suitably rigid materials including polymers, metals, or combinations thereof. Electronic device 100 may further comprise a power store (e.g., a battery) 305 and at least one printed circuit board (PCB) 322 onto which at least one at least one heat generating component 320 may be mounted such that the heat generating component 320 disposed within the housing. Examples of heat generating components 320 include electronic components such as processors, memory devices, display devices, and the like.

In the example depicted in FIGS. 3A-3C at least one internal heat dissipation device 330 positioned proximate at least one heat generating component 320. In some examples the at least one internal heat dissipation device 330 comprises a heat spreader which may be positioned proximate a processor 320 such that the heat spreader is in thermal communication with the processor 320.

A thermal interface 340 may be defined in at least a portion of the housing 310 to allow direct thermal contact between the internal heat dissipation device 330 and an external heat dissipation device 350. In some examples the thermal interface 340 comprises an aperture 342 formed in at least a portion of the housing 310 proximate the heat dissipation device 330. As illustrated in FIGS. 3A-3C, the aperture 342 may comprise a structured surface configured to mate with a corresponding structured surface on the external heat dissipation device 362. In the example depicted in FIGS. 3A-3C the structured surface 342 comprises a plurality of ribs 344 formed from a material having a low thermal conductivity, e.g., a suitable polymer.

As illustrated in FIG. 3B-3C, the structure surface 342 may be configured to mate with a corresponding structured surface 372 thermally coupled to an external heat dissipation device 362. In the example depicted in FIGS. 3B-3C the structured surface 372 comprises a plurality of ribs 374 formed from a material having a high thermal conductivity, e.g., a suitable metallic material. For example, the external heat dissipation device 362 may be one component of a docking station 360 to which the electronic device 100 may be coupled. As best illustrated in FIG. 3C, when the electronic device 100 is coupled to the docking station 360 the ribs 374 of structured surface 372 are brought into thermal communication with heat spreader 330 to allow for efficient thermal dissipation from the internal heat dissipation device (i.e., heat spreader) 330 to the external heat dissipation device 362. In some examples external heat dissipation device 362 may include an active heat dissipation device such as a fan, a radiator, or the like. In other examples heat dissipation device 362 may include a passive heat dissipation device such as a heat spreader or the like.

Figure 4:
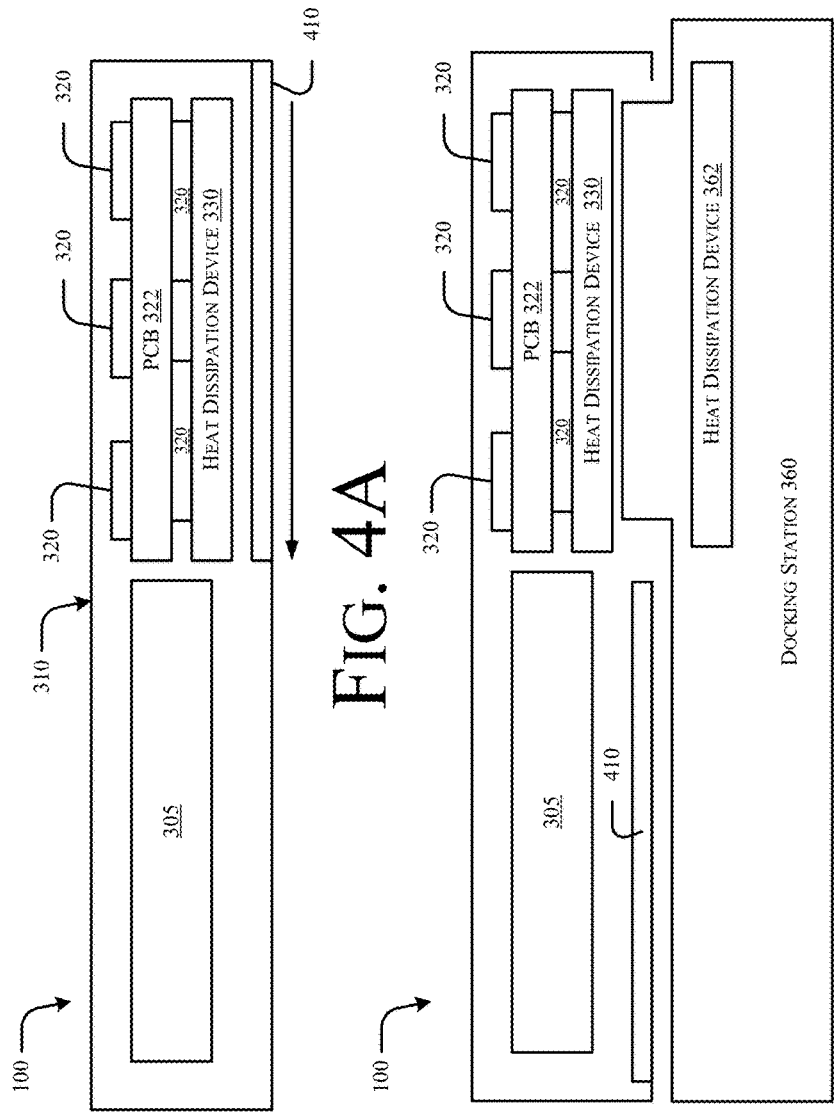
FIGS. 4A-4B are schematic illustrations of an electronic device which may be adapted to include a dynamic thermal platform operating point (TDP) in electronic devices in accordance with some examples.

FIGS. 4A-4B are schematic illustrations of an electronic device which may be adapted to include a dynamic thermal platform operating point (TDP) in accordance with some examples. Many of the components of the electronic device 100 depicted in FIGS. 4A-4B are the same as the components in the electronic device 100 depicted in FIGS. 3A-3C. In the interest of clarity the description of these components will not be repeated.

In the example depicted in FIG. 4A-4B the thermal interface 340 comprises a movable panel 410 in the housing 310 proximate the internal heat dissipation device 330. The movable panel 410 is movable between a first position in which the panel 410 covers the internal heat dissipation device 330 to a second position in which at least a portion of the internal heat dissipation device 330 is exposed. As illustrated in FIGS. 4A-4B, the moveable panel 410 may be moved to allow for thermal coupling between the internal heat dissipation device 330 and an external heat dissipation device 362 which may be one component of a docking station 360, as described above.

Having described various structures of a system to implement a dynamic thermal management operating point (TDP) for electronic devices, operating aspects of a system will be explained with reference to FIG. 5, which is a flowchart illustrating operations in a method to implement a dynamic thermal platform operating point (TDP) in electronic devices in accordance with some examples. The operations depicted in the flowchart of FIG. 5 may be implemented by the operating mode management unit 176, alone or in combination with other component of electronic device 100.

Figure 5:
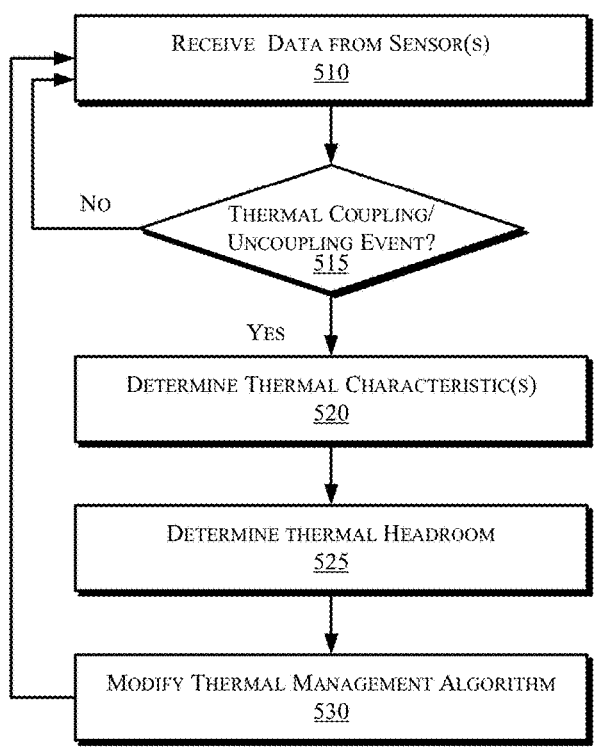
FIG. 5 is a flowchart illustrating operations in a method to implement a dynamic thermal platform operating point (TDP) in electronic devices in accordance with some examples.

Referring to FIG. 5, at operation 510 the operating mode management unit 176 receives data output from of one or more sensors e.g., sensors 232, 234.

At operation 515 it is determined whether there was a thermal coupling or uncoupling event. For example, if at operation 515 the output of the coupling sensor 234 indicates that the internal heat dissipation device 330 has been thermally coupled to the external heat dissipation device 362 then the output of the coupling sensor would indicate that a coupling event has taken place. Similarly, if the output of the coupling sensor 234 indicates that the internal heat dissipation device 330 has been thermally uncoupled from the external heat dissipation device 362 then the output of the coupling sensor would indicate that an uncoupling event has taken place. If neither coupling nor an uncoupling event has taken place since the last data received from the coupling sensor 234 then control passes back to operation 510 and the operating mode management unit 176 continues to monitor the sensor(s) 232, 234.

By contrast, if at operation 515 the output of the coupling sensor 234 indicates that either a coupling event or an uncoupling event has occurred then control passes to operation 520. At operation 520 the operating mode management unit 176 initiates an operation to determine one or more thermal characteristics of the operating environment of electronic device 100. By way of example, in response to a thermal coupling event signal from the coupling sensor 230 the operating mode management unit 176 may try to determine a heat dissipation capacity of the electronic device. This may be performed directly. For example, the operating mode management unit may increase the heat generated by heat generating components 320 e.g., by increasing the operating speed of a processor or increasing the brightness of a display, and may measure the temperature inside the housing 310 of electronic device in order to determine a heat dissipation capacity of the electronic device at varying operating parameters. Data representative of this relationship may be stored in a memory such as memory 260.

Alternatively, or in addition, the operating mode management unit may determine a heat dissipation capacity of the electronic device by determining the external heat dissipation device 362 to which the internal heat dissipation device 330 is coupled and determining heat dissipation characteristic(s) associated therewith. For example, the operating mode management unit 176 may initiate a communication session with the docking station 360 pursuant to which the docking station 360 may identify itself to the electronic device 100. Heat dissipation capabilities associated with the docking station may be communicated to the operating mode management unit via the communication session. Data representative of this relationship may be stored in a memory such as memory 260.

At operation 525 the operating mode management unit 176 may determine a thermal headroom available for the operation of the electronic device 100. For example, the operating mode management module 176 may review the heat dissipation data stored in memory 260 at operation 520 to determine how much more thermal power may be dissipated by the electronic device 100 while it is coupled to the external heat dissipation device 362.

At operation 530 the operating mode management unit 176 modifies a thermal management algorithm for the electronic device 100 to accommodate the increased heat dissipation capabilities from the external heat dissipation device 362. By way of example, the operating mode management unit may allow the operating frequency of one or more processors 320 on the electronic device 100 to be increased. Alternatively, or in addition, the operating mode management unit may allow multiple displays to be powered by the electronic device 100 or to increase the brightness or resolution of displays powered by electronic device 100.

Once the thermal management algorithm has been modified to compensate for the increase in the thermal dissipation capabilities of external heat dissipation device 362 control may pass back to operation 510 and the operating management module 176 continues to monitor the data from sensors 232, 234. If, at operation 515 the output of the coupling sensor 234 indicates that an uncoupling event has occurred, e.g., if the electronic device 100 is removed from the docking station, then control passes to operation 520.

Again, at operation 520 the operating mode management unit 176 may initiate a routine to determine a heat dissipation capacity of the electronic device. Many electronic devices are equipped with a thermal design operating point (TDP) which includes thermal data for various components of the electronic device at different operating speeds or characteristics. In some examples the operating mode management unit 176 may revert to the thermal design operating point (TDP) for the electronic device 100 when an uncoupling event is detected by coupling sensor 234. In other examples the thermal characteristics may be performed directly. For example, the operating mode management unit may decrease the heat generated by heat generating components 320 e.g., by decreasing the operating speed of a processor or decreasing the brightness of a display, and may measure the temperature inside the housing 310 of electronic device in order to determine a heat dissipation capacity of the electronic device at varying operating parameters. Data representative of this relationship may be stored in a memory such as memory 260.

At operation 525 the operating mode management unit 176 may determine a thermal headroom available for the operation of the electronic device 100. For example, the operating mode management module 176 may review the heat dissipation data stored in memory 260 at operation 520 to determine how much less thermal power may be dissipated by the electronic device 100 while it is not coupled to the external heat dissipation device 362.

At operation 530 the operating mode management unit 176 modifies the thermal management algorithm to accommodate the increased heat dissipation capabilities from the external heat dissipation device 362. By way of example, the operating mode management unit may allow the operating frequency of one or more processors 320 on the electronic device 100 to be decreased. Alternatively, or in addition, the operating mode management unit may shut down one or more displays to be powered by the electronic device 100 or to decrease the brightness or resolution of displays powered by electronic device 100.

Thus, the structure and operations described herein enable the operating mode management unit 176 to implement a dynamic thermal management algorithm for the electronic device 100 depending upon the heat dissipation capabilities available to dissipate heat from the electronic device 100. When the electronic device 100 is operating in a stand-alone environment it may operate according to a first thermal management algorithm. However, when the electronic device is coupled to an external heat dissipation device, e.g., in a docking station, then the device may be operating in accordance with a different thermal management algorithm.

Figure 6:
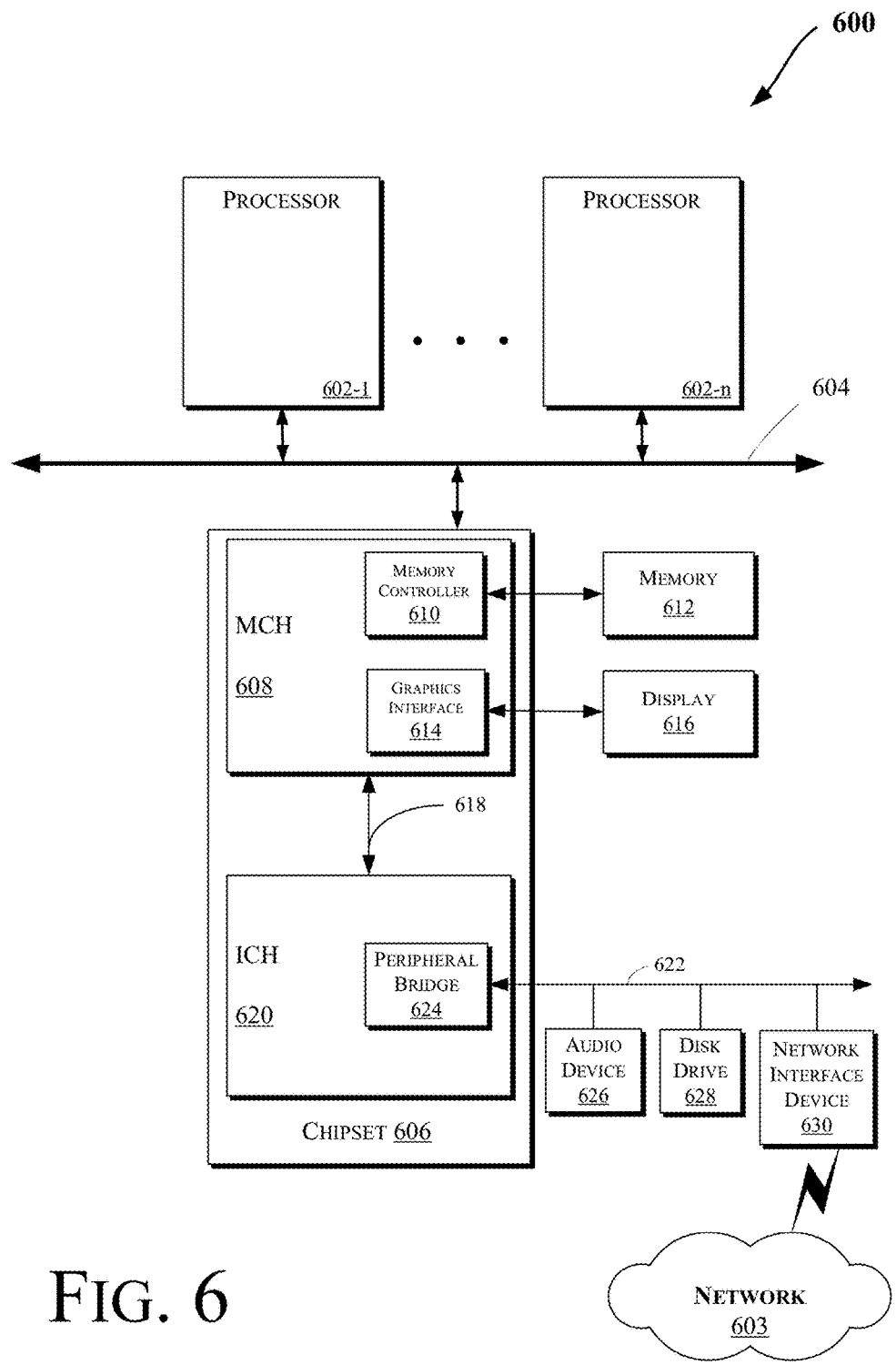
FIGS. 6-10 are schematic illustrations of electronic devices which may be adapted to implement a dynamic thermal platform operating point (TDP) in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
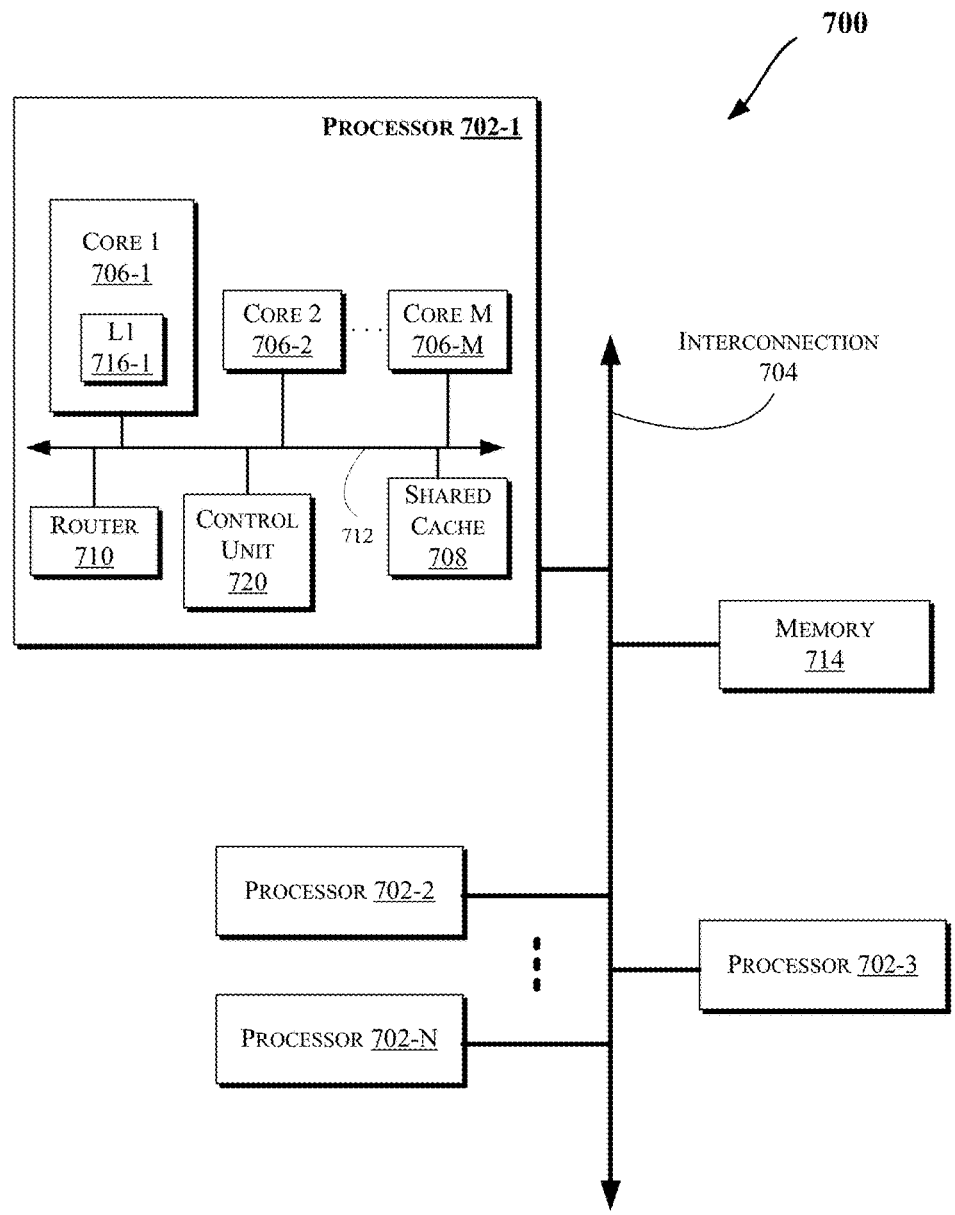

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
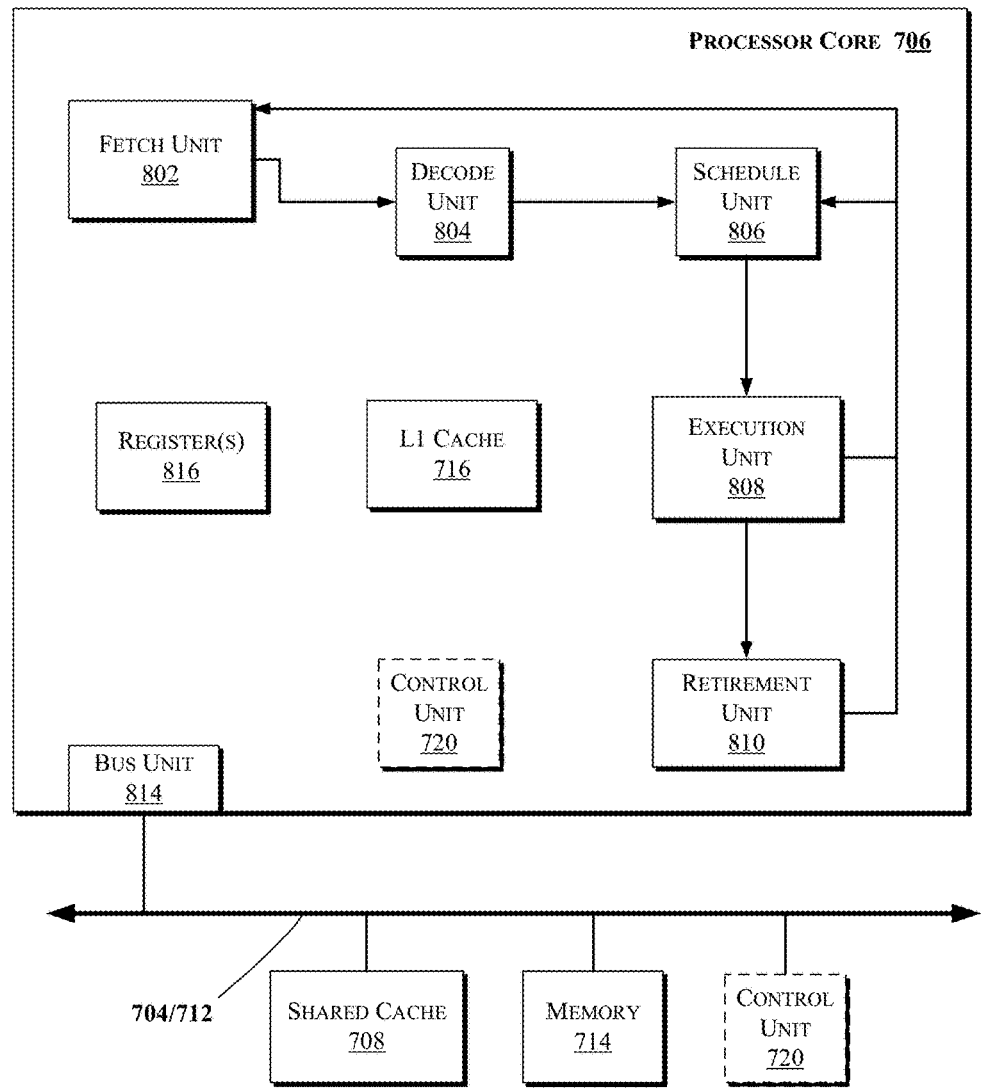

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
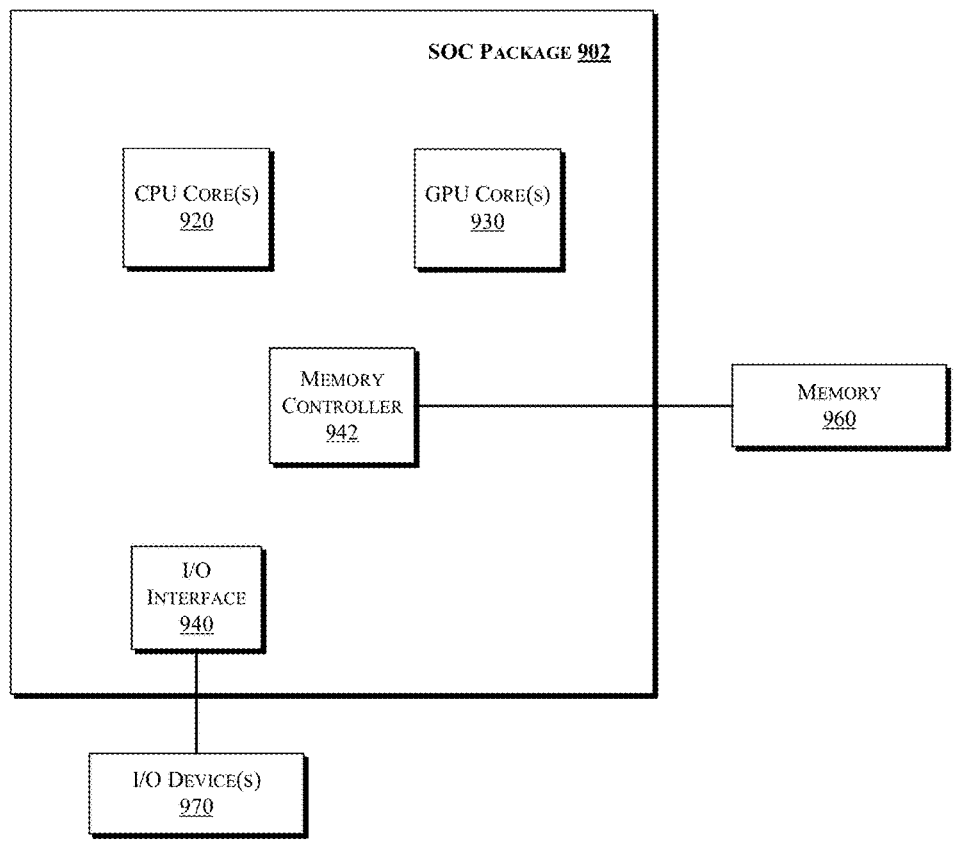

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
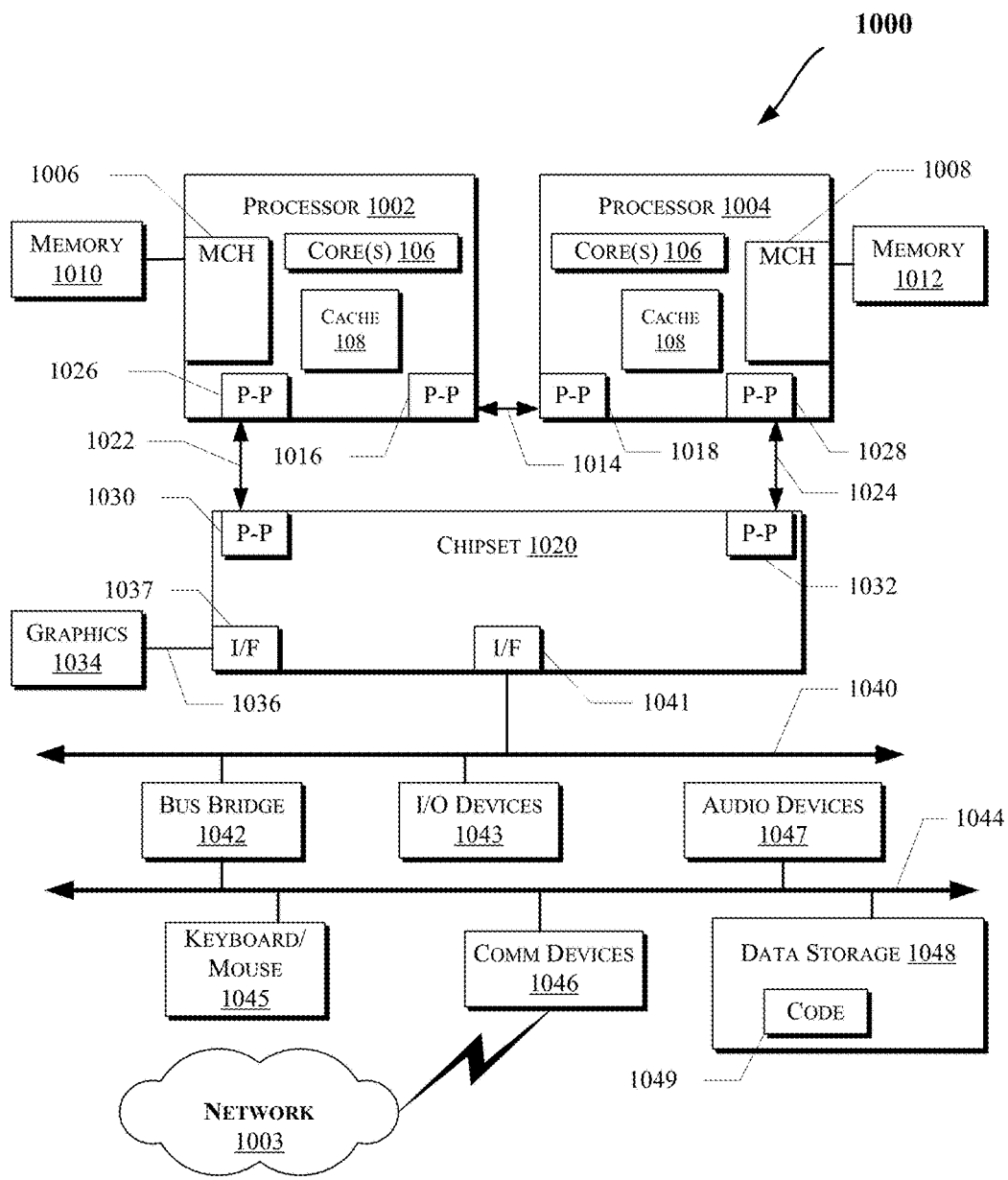

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is an electronic device, comprising a housing, at least one heat generating component disposed within the housing, at least one internal heat dissipation device positioned proximate the at least one heat generating component, and a thermal interface defined in at least a portion of the housing to allow direct thermal contact between the internal heat dissipation device and an external heat dissipation device.

In Example 2, the subject matter of Example 1 can optionally include an arrangement in which the at least one heat generating device comprises at least one processor, and the at least one internal heat dissipation device comprises a heat spreader positioned proximate the processor and in thermal communication with the processor.

In Example 3, the subject matter of any one of Examples 1-2 can optionally include an arrangement in which the thermal interface comprises an aperture formed in at least a portion of the housing proximate the heat dissipation device.

In Example 4, the subject matter of any one of Examples 1-3 can optionally an arrangement in which the aperture comprises a structured surface configured to mate with a corresponding structured surface thermally coupled to the external heat dissipation device.

In Example 5, the subject matter of any one of Examples 1-4 can optionally include an arrangement in which the structured surface comprises a plurality of ribs formed from a material having a low thermal conductivity.

In Example 6, the subject matter of any one of Examples 1-5 can optionally include an arrangement in which the thermal interface comprises a movable panel in the housing proximate the internal heat dissipation device.

In Example 7, the subject matter of any one of Examples 1-6 can optionally include an arrangement in which the movable panel is movable between a first position in which the panel covers the internal heat dissipation device to a second position in which at least a portion of the internal heat dissipation device is exposed.

In Example 8, the subject matter of any one of Examples 1-7 can optionally include a sensor to detect when the internal heat dissipation device is thermally coupled to the external heat dissipation device.

In Example 9, the subject matter of any one of Examples 1-8 can optionally include an operating mode management unit comprising logic, at least partly including hardware logic, to receive a signal from the sensor indicating that the internal heat dissipation device is thermally coupled to the external heat dissipation device, and in response to the signal, to modify a thermal platform operating point (TDP) by modifying a thermal management algorithm for the electronic device.

In Example 10, the subject matter of any one of Examples 1-9 can optionally include logic, at least partially including hardware logic, to measure at least one thermal characteristic of the electronic device and use the at least one thermal characteristic to modify the thermal platform operating point (TDP) by modifying a thermal management algorithm for the electronic device.

In Example 11, the subject matter of any one of Examples 1-10 can optionally include logic, at least partially including hardware logic, to receive a signal from the sensor indicating that the internal heat dissipation device has been thermally decoupled from the external heat dissipation device; and in response to the signal, to modify a thermal platform operating point (TDP) by modifying a thermal management algorithm for the electronic device.

In Example 12, the subject matter of any one of Examples 1-11 can optionally include logic, at least partially including hardware logic, to measure at least one thermal characteristic of the electronic device and use the at least one thermal characteristic to modify the thermal platform operating point (TDP) by modifying a thermal management algorithm for the electronic device.

Example 13 is chassis for an electronic device, comprising a housing, at least one internal heat dissipation device positioned in the housing, and a thermal interface defined in at least a portion of the housing to allow direct thermal contact between the heat dissipation device and an external heat dissipation device.

In Example 14, the subject matter of Example 13 can optionally include an arrangement in which the at least one internal heat dissipation device comprises a heat spreader.

In Example 15, the subject matter of any one of Examples 13-14 can optionally include an arrangement in which the thermal interface comprises an aperture formed in at least a portion of the housing proximate the heat dissipation device.

In Example 16, the subject matter of any one of Examples 13-15 can optionally include an arrangement in which the aperture comprises a structured surface configured to mate with a corresponding structured surface thermally coupled to the external heat dissipation device.

In Example 17, the subject matter of any one of Examples 13-16 can optionally include an arrangement in which the structured surface comprises a plurality of ribs formed from a material having a low thermal conductivity.

In Example 18, the subject matter of any one of Examples 13-17 can optionally include an arrangement in which the thermal interface comprises a movable panel in the housing proximate the internal heat dissipation device.

In Example 19, the subject matter of any one of Examples 13-18 can optionally include an arrangement in which the movable panel is movable between a first position in which the panel covers the internal heat dissipation device to a second position in which at least a portion of the internal heat dissipation device is exposed.

Example 20 is a controller comprising logic, at least partly including hardware logic, to receive a signal from a sensor indicating that an internal heat dissipation device in an electronic device is thermally coupled to an external heat dissipation device and in response to the signal, to modify a thermal platform operating point (TDP) by modifying a thermal management algorithm for the electronic device.

In Example 21, the subject matter of Example 20 can optionally include logic, at least partly including hardware logic, to measure at least one thermal characteristic of the electronic device and use the at least one thermal characteristic to modify the thermal platform operating point (TDP) by modifying a thermal management algorithm for the electronic device.

In Example 22, the subject matter of any one of Examples 20-21 can optionally include logic, at least partly including hardware logic, to receive a signal from the sensor indicating that the internal heat dissipation device has been thermally decoupled from the external heat dissipation device and in response to the signal, to modify a thermal platform operating point (TDP) by modifying a thermal management algorithm for the electronic device.

In Example 23, the subject matter of any one of Examples 20-22 can optionally include logic, at least partially including hardware logic, configured to measure at least one thermal characteristic of the electronic device and use the at least one thermal characteristic to modify the thermal platform operating point (TDP) by modifying a thermal management algorithm for the electronic device.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An electronic device, comprising:
    a housing;
    at least one heat generating component disposed within the housing;
    at least one internal heat dissipation device positioned proximate the at least one heat generating component; and
    a thermal interface defined in at least a portion of the housing to allow direct thermal contact between the internal heat dissipation device and an external heat dissipation device, wherein the thermal interface comprises an aperture having a structured surface comprising a plurality of ribs configured to mate with a corresponding structured surface comprising a plurality of ribs thermally coupled to the external heat dissipation device; and
    an operating mode management unit comprising logic, at least partly including hardware logic, to:
        receive a signal from a first sensor indicating that the internal heat dissipation device is thermally coupled to the external heat dissipation device; and
        in response to the signal, to modify a thermal platform operating point (TDP) by modifying a thermal management algorithm for the electronic device.

2. The electronic device of claim 1, wherein:
    the at least one heat generating device comprises at least one processor; and
    the at least one internal heat dissipation device comprises a heat spreader positioned proximate the processor and in thermal communication with the processor.

3. The electronic device of claim 1, wherein the structured surface comprises a plurality of ribs formed from a material having a low thermal conductivity.

4. The electronic device of claim 2, wherein:
    the thermal interface comprises a movable panel in the housing proximate the internal heat dissipation device.

5. The electronic device of claim 4, wherein the movable panel is movable between a first position in which the panel covers the internal heat dissipation device to a second position in which at least a portion of the internal heat dissipation device is exposed.

6. The electronic device of claim 1, further comprising:
    a second sensor to detect when the internal heat dissipation device is thermally coupled to the external heat dissipation device.

7. The electronic device of claim 1, wherein the operating mode management unit further comprises logic, at least partially including hardware logic, to:
    measure at least one thermal characteristic of the electronic device; and
    use the at least one thermal characteristic to modify the thermal platform operating point (TDP) by modifying a thermal management algorithm for the electronic device.

8. The electronic device of claim 1, wherein the operating mode management unit further comprises logic, at least partially including hardware logic, to:
    receive a signal from the sensor indicating that the internal heat dissipation device has been thermally decoupled from the external heat dissipation device; and
    in response to the signal, to modify a thermal platform operating point (TDP) by modifying a thermal management algorithm for the electronic device.

9. The electronic device of claim 1, wherein the operating mode management unit further comprises logic, at least partially including hardware logic, to:
    measure at least one thermal characteristic of the electronic device; and
    use the at least one thermal characteristic to modify the thermal platform operating point (TDP) by modifying a thermal management algorithm for the electronic device.

* * * * *